United States Patent
Ecker (10) Patent No.: US 12,387,301 B2
(45) Date of Patent: Aug. 12, 2025

(54) METHOD FOR FILLING MISSING DISPARITY VALUES OF PIXELS COMPRISED IN AN IMAGE

(71) Applicant: INUITIVE LTD., Raanana (IL)

(72) Inventor: Ady Ecker, Ness Ziona (IL)

(73) Assignee: INUITIVE LTD., Ra' anana (IL)

( * ) Notice: Subject to any disclaimer, the term of this patent is extended or adjusted under 35 U.S.C. 154(b) by 336 days.

(21) Appl. No.: 18/170,019

(22) Filed: Feb. 16, 2023

(65) Prior Publication Data
US 2024/0281937 A1 Aug. 22, 2024

(51) Int. Cl.
*G06T 5/77* (2024.01)
*G06T 3/4007* (2024.01)
(Continued)

(52) U.S. Cl.
CPC .............. *G06T 5/77* (2024.01); *G06T 3/4007* (2013.01); *G06T 5/70* (2024.01); *G06T 7/13* (2017.01);
(Continued)

(58) Field of Classification Search
CPC ........... G06T 5/77; G06T 3/4007; G06T 5/70; G06T 7/13; G06T 2207/10012;
(Continued)

(56) References Cited

U.S. PATENT DOCUMENTS

2016/0227187 A1* 8/2016 Supikov ............... H04N 13/128
2019/0306515 A1* 10/2019 Shima .................... H04N 19/85
(Continued)

OTHER PUBLICATIONS

F. Li, B. Chen and W.-h. Leng, "A Hole Repairing Method for Triangle Mesh Surfaces," 2006 International Conference on Computational Intelligence and Security, Guangzhou, China, 2006, pp. 972-975, doi: 10.1109/ICCIAS.2006.295406 (Year: 2006).*
(Continued)

*Primary Examiner* — Amandeep Saini
*Assistant Examiner* — Andrew S Budisalich
(74) *Attorney, Agent, or Firm* — FisherBroyles, LLP; Roger L. Browdy; Ronni S. Jillions (57) ABSTRACT

A method is described for processing data retrieved from two image capturing sensors, by filling missing disparity values of pixels included in holes comprised in the retrieved data. The method comprises: retrieving data by the two image capturing sensors, wherein the retrieved data includes data that relates to at least one pixel for which no disparity related information is provided; arranging the retrieved data in a form of a raster that comprises a plurality of disparity values representing the retrieved data, arranged in rows and columns; identifying boundary pixels included in the retrieved data, wherein the boundary pixels are pixels adjacent to the pixel for which no information is provided; determining which of the holes, should be filled; inserting disparity values of the boundary pixels surrounding holes that should be filled, into a queue implemented in a linear array; repeatedly extracting a pixel from the queue, obtaining its disparity value by interpolating disparity values of its adjacent and remote neighbors, and inserting all its adjacent neighboring pixels for which no disparity values have been provided, into the queue; and adding to the data retrieved, disparity values for all pixels having originally missing values.

8 Claims, 4 Drawing Sheets

(51) Int. Cl.
*G06T 5/70* (2024.01)
*G06T 7/00* (2017.01)
*G06T 7/13* (2017.01)
*G06T 11/40* (2006.01)
*G06V 10/74* (2022.01)

(52) U.S. Cl.
CPC .. *G06V 10/761* (2022.01); *G06T 2207/10012* (2013.01); *G06T 2207/20228* (2013.01)

(58) Field of Classification Search
CPC . G06T 2207/20228; G06T 11/40; G06T 7/97; G06V 10/761
See application file for complete search history.

(56) References Cited

U.S. PATENT DOCUMENTS

| | | | | |
|---|---|---|---|---|
| 2019/0378332 | A1* | 12/2019 | Sun | G06T 17/20 |
| 2022/0066017 | A1* | 3/2022 | Gipson | G01S 15/8925 |
| 2023/0111818 | A1* | 4/2023 | Pereira | G06N 3/084 |
| | | | | 382/156 |

OTHER PUBLICATIONS

Loizou, Marios, Melinos Averkiou, and Evangelos Kalogerakis. "Learning part boundaries from 3d point clouds." Computer Graphics Forum. vol. 39. No. 5. 2020. (Year: 2020).*

Atapour-Abarghouei, Amir, and Toby P. Breckon. "Dealing with missing depth: recent advances in depth image completion and estimation." RGB-D Image analysis and processing (2019): pp. 15-50.

Atapour-Abarghouei, Amir, and Toby P. Breckon. "DepthComp: real-time depth image completion based on prior semantic scene segmentation." Engineering and Computer Science Durham University Durham, UK (2017).

Frommholz, Dirk. "Image interpolation on the CPU and GPU using line run sequences." ISPRS Annals of the Photogrammetry, Remote Sensing and Spatial Information Sciences (2022): pp. 53-60.

Alexandru Telea, "An Image Inpainting Technique Based on the Fast Marching Method", J. of Graphics Tools vol. 9, No. 1: pp. 25-36 May 2003.

* cited by examiner

METHOD FOR FILLING MISSING DISPARITY VALUES OF PIXELS COMPRISED IN AN IMAGE

TECHNICAL FIELD

The present disclosure generally relates to systems and methods for processing grid type information, and more particularly, it relates to methods of hole filling in a captured image.

BACKGROUND

The solution which the present invention seeks to provide is filling of missing values of a smooth function that is sampled by a sensor, where the automatic completion of missing values can improve, or simplify, the processing, or the visualization, of the sensed data.

Although this problem may be considered as somewhat related to the inpainting problem, the solution provided herein is different, as it does not aim to restoring an image, but rather it is directed to filling holes smoothly and efficiently in a captured image.

While the motivation of the present invention is primarily to fill missing disparity values in a 2D stereo disparity image, the problem is general, and the solution can be implemented in many applications, among which for example filling-in LIDAR depth values.

Amir Atapor-Abarghouei and Toby P. Breckon in their publication "Dealing with Missing Depth: Recent Advances in Depth Image Completion and Estimation", retrieved from https://breckon.org/toby/publications/papers/abarghouei19 missing-depth.pdf (hereinafter "P1") address the goal of completing the missing 3D information post capture since in many applications, incomplete scene depth is found to be of limited value and thus techniques are required to fill the holes that exist in terms of both missing depth and color scene information. In this publication, an overview of the state-of-the-art approaches within RGB-D completion is presented and the publication describes employment of learning-based techniques for this purpose and related depth estimation tasks.

In their publication, "Real-Time Depth Image Completion Based on Prior Semantic Scene Segmentation", Amir Atapor-Abarghouei and Toby P. Breckon, Engineering and Computer Science Durham University Durham, UK, 2017 (hereinafter "P2"), the authors discuss plausible hole filling in depth images in a computationally lightweight methodology. The publication proposes performing segmentation over a co-registered color image, commonly available from stereo depth sources, and non-parametrically fill missing depth values based on a multiple horizontal and vertical filling passes within each semantically labeled scene object. Results obtained, demonstrate that this approach has complexity and efficiency comparable to conventional interpolation techniques.

Dirk Frommholz, in "Image Interpolation on the CPU and GPU Using Line Run Sequences", ISPRS, Annals of the Photogrammetry, Remote Sensing and Spatial Information Sciences, Volume V-2-2022 XXIV ISPRS Congress (2022 edition), 6-11 Jun. 2022, Nice, France (hereinafter "P3"), describes an implementation of an image interpolation algorithm based on inverse distance weighting (IDW). The time-consuming search for support pixels bordering the voids to be filled is facilitated through gapless sweeps of different directions over the image. The scanlines needed for the sweeps are constructed from a path prototype per orientation whose regular substructures get reused and shifted to produce aligned duplicates covering the entire input bitmap. The line set is followed concurrently to detect existing samples around no data patches and compute the distance to the pixels to be a newly set in the set of void pixels.

Alexandru Telea, in "An Image Inpainting Technique Based on the Fast Marching Method", J. of Graphics Tools Vol. 9, No. 1: 25-36 May 2003 (hereinafter "P4"), describes a digital inpainting method that provides a mean for reconstruction of small damaged portions of an image. The author presents in this publication a new algorithm for digital inpainting, based on the fast marching method for level set applications. The algorithm is simple to implement, fast, and produces nearly identical results to more complex, and usually slower, methods that are known in the art.

SUMMARY OF THE DISCLOSURE

The disclosure may be summarized by referring to the appended claims.

As discussed above, the present solution is primarily directed to filling of missing disparity values in a 2D stereo disparity map. This solution has various applications, for example, filling-in LIDAR depth values, stereo images, and the like. Sometimes it can even be beneficial to intentionally create holes of missing information in the data, in areas having low confidence, and smooth the function at these missing information holes. For instance, in an application of active stereo, if there are large holes (i.e., areas that include pixels of which their associated disparity values are missing), between the spots of the projector, it may not be possible to estimate subpixel disparity accurately. It is possible to invalidate values of pixels' disparity in such holes as they have low confidence, and fill the disparity values using a filling method.

It is an object of the present disclosure to provide a method for filling missing disparity values in a 2D stereo disparity image.

It is another object of the present disclosure to provide a method for filling smoothly holes that are present mainly in data retrieved from at least two image capturing sensors used to generate a 2D stereo image, rather than holes that are present in the images.

Other objects of the present invention will become apparent from the following description.

According to an embodiment of the disclosure, there is provided a method for use in processing data retrieved from at least two image capturing sensors used to generate a 2D stereo image, wherein the method is configured to fill missing disparity values of pixels included in one or more holes comprised in the retrieved data, wherein the method comprises the steps of:

retrieving data by at least two image capturing sensors for generating a 2D stereo image, wherein the retrieved data includes data that relates to at least one pixel for which no disparity related information is provided;

arranging the retrieved data in a form of a raster that comprises a plurality of disparity values representing the retrieved data, wherein the values are arranged in rows and columns;

identifying boundary pixels included in said retrieved data, wherein the boundary pixels are pixels adjacent to the at least one pixel for which no information is provided;

determining which of the one or more holes, should be filled. For example, holes such as a hole being greater than a pre-determined size, a hole connected to the image border, or a hole located in the direction of the sky may not be filled;

inserting disparity values of one or more of the boundary pixels surrounding holes that should be filled, into a queue implemented in a linear array;

repeatedly extracting a pixel from the queue, obtaining its disparity value by interpolating disparity values of its adjacent and remote neighbors, and inserting all its adjacent neighboring pixels for which no disparity values have been provided, to the queue; and adding to the data retrieved disparity values for all pixels having originally missing values and wherein these pixels are included in all the holes determined as holes that should be filled, for example for generating an image in which all pixels having missing disparity values that are included only in all the holes determined as holes that need to be filled, has a respective disparity value.

The term "hole" as used herein throughout the specification and claims, is used to denote a region of one or more pixels that belong to an image and characterized in that none of the one or more pixels is currently associated with a respective disparity value.

By still another aspect there is provided a method for use in processing data retrieved from at least two image capturing sensors used to generate a 2D stereo image, wherein the method is configured to fill missing disparity values of pixels included in that image, wherein the method comprises the steps of:

a) receiving an image or part thereof that comprises a plurality of pixels each associated with a respective disparity value and at least one pixel having no disparity value associated therewith;

b) identifying all pixels having known respective disparity values being boundary pixels, that are located adjacent to pixels having no disparity value associated therewith;

c) inserting the pixels (e.g., coordinates of the pixels) having no disparity value associated therewith, that are adjacent to at least one boundary pixel, into a queue, preferably implemented in a form of an array;

d) applying a loop of popping pixels from the queue until the queue is empty, by which pixel (i,j) is popped from the queue, and confirming whether that pixel (i,j) has a value associated therewith or not. Since pixel (i,j) may be inserted to the queue a number of times by different neighbors thereof, then once it becomes associated with a disparity value, at the proceeding occasion that pixel (i,j) is popped, it will be considered as a pixel having a disparity value associated therewith;

e) determining if pixel (i−1,j) is a boundary pixel, and if in the affirmative, identifying a next boundary pixel (i+d,j) along a column to which pixel (i,j) belongs, and setting the value vi to:

$vi=(I[i-1,j]*d+I[i+d,j])/(d+1)$ whereas if a next boundary pixel does not exist, setting vi to vi=I[i−1,j]), and if pixel (i−1,j) is not a boundary pixel, and if (i+1,j) is a boundary pixel;

identifying a next boundary pixel (i−d,j) along a column to which pixel (i,j) belongs, and setting the value vi to:

$vi=(I[i+1,j]*d+I[i-d,j])/(d+1)$ and if a next boundary pixel does not exist, setting vi to vi=I[i+1,j]);

f) determining if pixel (i,j−1) is a boundary pixel, and if in the affirmative, identifying a next boundary pixel (i,j+d) along a row to which pixel (i,j) belongs, and setting the value vj to:

$vj=(I[i,j-1]*d+I[i,j+d])/(d+1)$ whereas if a next boundary pixel does not exist, setting vj to vj=I[i+1,j]), and if (i,j+1) is a boundary pixel:

identifying a next boundary pixel (i,j−d) along that row to which pixel (i,j) belongs, and setting the value vj to:

$vj=(I[i,j+1]*d+I[i,j-d])/(d+1)$ while if a next boundary pixel does not exist, then vj=I[i,j+1]);

g) if both vi and vj exist, setting the value of pixel (i,j) to be equal to (vi+vj)/2, if only vi exists, setting the value of pixel (i,j) to be equal to vi, and if only vj exists, setting the value of pixel (i,j) to be equal to vj;

h) inserting coordinates' values of pixel (i,j)'s neighbors, namely, pixels (i−1,j), (i+1,j), (i,j−1) and (i,j+1) into the queue, provided that these coordinates are each associated with a pixel having no disparity value, and if so, marking (i,j) as a boundary pixel.

In accordance with another embodiment of the present disclosure, the disparity values are determined by carrying out a weighted linear interpolation between an adjacent neighbor of the at least one pixel for which no information is provided, and a remote neighbor of the at least one pixel for which no information is provided (to be referred to hereinafter as a "lookahead neighbor"), wherein most of the weight for carrying out the weighted linear interpolation is placed onto the adjacent pixel, while enough weight is assigned to the remote neighbor, thereby enabling disparity values of pixels that are processed towards another side of a pixel having a missing image value, its value will be interpolated linearly between two boundaries.

According to another embodiment of the disclosure, the method provided comprises smoothing the disparity values between boundary fronts that approach each other dynamically while processing the retrieved data.

According to another embodiment, the processing of the disparity values of pixels which are not associated with a disparity value is carried out dynamically, and is determined according to a shape of the original boundary of the original image, while the boundary between pixels having each a respective disparity value and pixels that are not associated with a respective disparity value, evolves dynamically.

By yet another embodiment, the method for filling the disparity values of pixels for which no information has been received, is carried out by implementing dynamic lists.

In accordance with still another embodiment the method for filling the disparity values of pixels for which no information has been received, is done by implementing a fixed pre-defined horizontal and vertical lookahead processing.

According to another embodiment the method for filling the disparity values of pixels for which no information has been received, is carried out by implementing a fixed pre-defined horizontal, vertical and diagonal lookahead processing.

In accordance with another embodiment, although the method described herein relates to filling holes in a 2D grid, The very same method can be extended to fill holes in higher dimensional grids, for example, 3D voxel grids.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein or recited in the claims.

In the following description, for the purposes of explanation, numerous specific details are set forth in order to provide a better understanding of the present invention by way of examples. It should be apparent, however, that the present invention may be practiced without these specific details.

The following description demonstrates an example construed in accordance with the present invention, which comprises a method that has the following characteristics:
1. It operates on raster data. The raster consists of a matrix of cells (or pixels) organized into rows and columns (i.e., a grid) where each cell contains a value representing information.
2. It enables smooth filling of missing values from the grid (in "discrete sense").
3. It enables interpolating the boundary values of the holes (in "discrete sense").
4. The shape of the region of missing values is not necessarily of pre-defined shape, such as a convex shape or star-shape, and instead it can take any shape. Moreover, there could even be islands of specified values within a region of missing values.
5. The disparity values need not be specified for every point located at the boundary of the grid (the image boundaries). Instead, the method enables obtaining missing values at the boundary of the grid through extrapolation.
6. If the boundary of a hole consists of points residing at a plane, the interior encompassed by that boundary is interpolated planarly.
7. The running time of a program being executed in accordance with an embodiment of the present invention, is linear in the number of pixels comprised within the image. The term "linear" is applicable for the fixed-lookahead version, or for the lists' implementation for common hole shapes such as convex shapes. These implementations are described hereinafter. However, in practice, the term linear is applicable for many other hole shapes, but there is no guarantee as to the results that will be obtained in linear time for arbitrary input hole shapes.
8. The method is simple to implement.

Most of the interpolation methods known in the art, do not satisfy at least one of the above characteristics. For example, a raster-scan interpolation (e.g., along the image rows) is not a continuous interpolation method (in case the boundary is not convex, as demonstrated in FIG. 1). Low-order parametric fitting (e.g., by a plane or by a quadratic surface) cannot smoothly interpolate any boundary. Solving a Poisson equation has running time that is not linear in the number of pixels.

Figure 1:
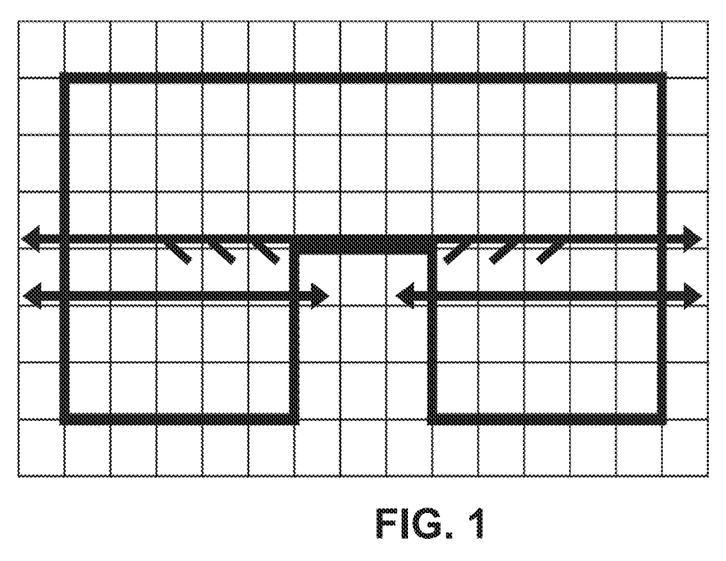
FIG. 1—illustrates some of the problems associated with prior art solutions.

Some of the problems associated with prior art solutions are demonstrated in FIG. 1. The region that needs to be filled is located within the black boundary.

Scanline interpolation is used for interpolating two adjacent rows using boundary pixels which might differ substantially from each other. Unfortunately, such an interpolation might create a discontinuity problem between the interpolated values at the two rows (indicated by the slanted line segments).

The very same problem remains when the method is implemented to combine scanline interpolation along both rows and columns.

Figure 2:
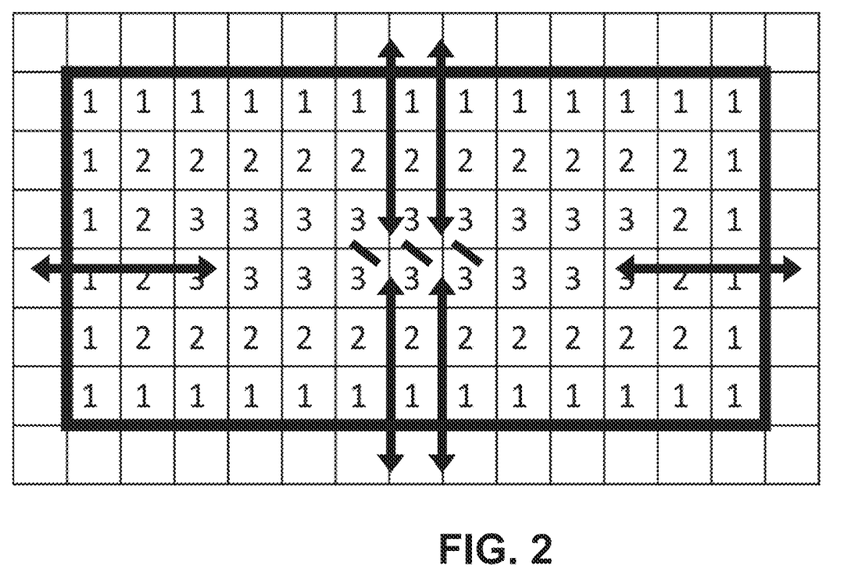
FIG. 2—illustrates some of the problems associated with implementing prior art propagation methods.

FIG. 2 illustrates problems associated with implementing prior art propagation algorithms, such as the one described in P4.

A propagation algorithm typically processes the pixels' values according to the pixels' distance from the boundary. In FIG. 2, the algorithm first operates on the pixels that belong to layer "1", then those of layer "2", and then those of layer "3".

When the boundary values at the top and bottom differ substantially from each other, the propagation from both sides will meet at the middle, at a discontinuity.

As the top and bottom boundaries are much closer to each other than the left and right boundaries, the propagation from the side boundaries will not reach in time in order to smooth a clash that exists between the values propagated from the top and bottom boundaries.

However, all methods known in the art, implementing a Fast Marching Method ("FMM"), such as the method described in P4, do not satisfy several of the above recited characteristics. The main problem in implementing a pure propagation algorithm is that clear edges may be formed within the filled regions as depicted in FIG. 2. In addition, the reconstruction, when carried out using a planar boundary, might have a non-planar shape, and the use of a priority queue might exceed a linear running time in the sense of the pixels' number.

The steps of the method proposed by the present invention which are carried out in a loop, are:
1. Inserting into a queue the coordinates of pixels having missing values, wherein these pixels are adjacent to the boundary of the hole.
2. Assuming that the queue is not empty, extracting a pixel's coordinates from the queue, interpolating the disparity value using the extracted pixel's neighbors, and inserting all of its neighboring pixels having missing values into the queue.

The solution provided by the present invention seeks to address these limitations. First, we traverse the missing values in a Breadth First Search (BFS) order, using a FIFO queue implemented in an array, which is a linear-time traversal over the pixels of the grid (contrary to the priority queue in P4 implementation which operates in $O(n*\log(n))$). There is an inherent problem in P4 solution which requires making decisions at each pixel based only on local information. The Fast Marching Method (FMM) was originally designed to solve the Eikonal equation, where it is possible to determine the value of the next pixel based on a subset of its neighbors in a particular direction, without taking into account all of its neighbors. This method was then implemented in image inpainting, which relies on the fact that the value of a pixel can be set based on values of a subset of its neighbors. Contrary to that, as will be described in the following description, according to the solution proposed by the present invention, the decisions are taken based on both values of adjacent neighboring pixels and values of remote pixels, which enable adopting a looking ahead functionality. This mechanism allows smoothing between boundary fronts that approach each other dynamically.

As a consequence of the linear interpolation steps in the horizontal or vertical directions described above, if the boundary consists of points on a plane, the method provided enables interpolating the interior of the hole region to a planar outcome. Having planar interpolation is particularly useful for disparity or depth interpolation, as many regions, e.g., building floors, are planar.

The proposed solution of the present invention is carried out by a processor which is provided with an input that comprises information that is associated with an image (or part of an image), where the disparity values are specified for some pixels, while for other pixels, such values are missing.

Figure 3:
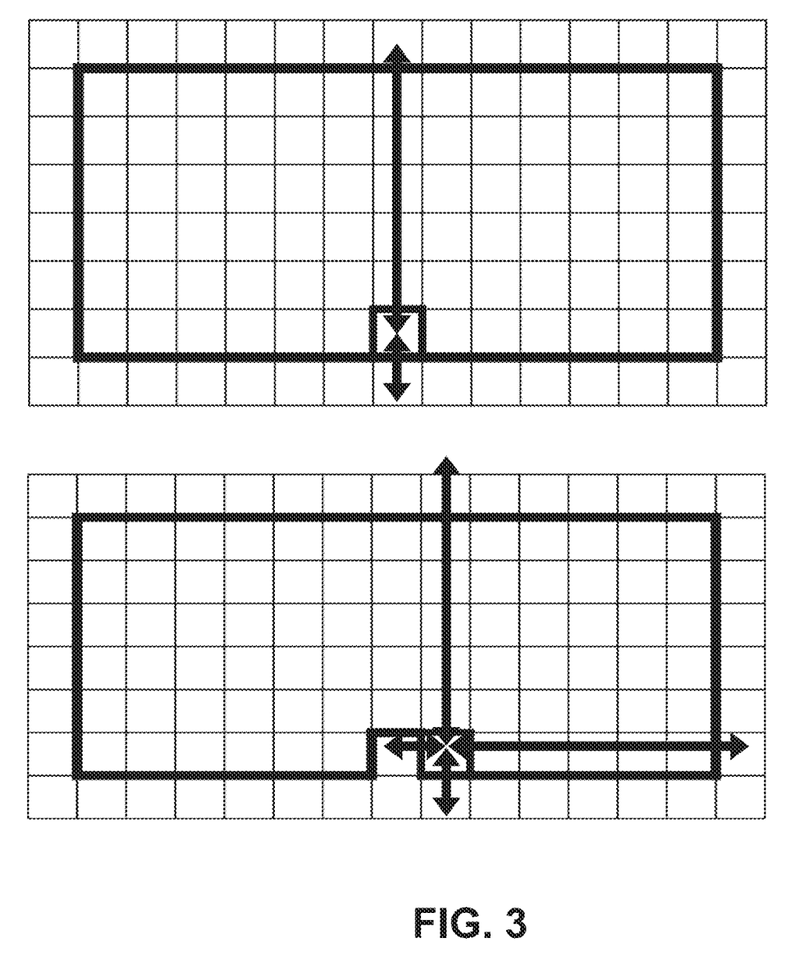
FIG. 3—exemplifies an embodiment construed in accordance with the present disclosure where the propagation is carried out using a lookahead approach.

FIG. 3 demonstrates an embodiment construed in accordance with the present invention, wherein this embodiment is based on the propagation approach that comprises lookahead functionality. This functionality is achieved in accordance with the following:

The disparity value of a pixel adjacent to a boundary pixel in a single direction (either horizontal or vertical, but not both), is the linear interpolation of the disparity of an adjacent boundary pixel and the disparity of a remote boundary pixel in that direction. It is possible that a remote boundary pixel with a specified disparity does not exist, in which case the disparity is set according to the adjacent boundary pixel. It is also possible that the remote boundary pixel is just one pixel away from the pixel being processed.

The disparity value of a pixel adjacent to two or more boundary pixels, where at least one is in the horizontal direction and at least one is in the vertical direction, is the average of horizontal and vertical linear interpolations, as referred to above. Each interpolation is made between the disparity value of an adjacent pixel and a disparity value of a remote pixel.

Let us denote the disparity values of pixel (i,j) as I[i,j]. The output of the processing operation carried out by the processor, is the original image in which the missing image values of the relevant pixels are filled with interpolated image values.

The present invention relies on carrying out a weighted linear interpolation between the disparity value of an adjacent neighbor and the disparity value of a remote neighbor (to be referred to hereinafter as a "lookahead neighbor"). While most of the weight is given to the value associated with adjacent pixel, sufficient weight is assigned to the remote neighbor so that if the pixels' values are processed towards the other side of the hole, the values will be interpolated linearly between the boundaries.

The evolution of the boundary pixels is dynamic, and is determined according to the shape of the original boundary. Since the boundary is effectively moving both in the horizontal and vertical directions, it is possible to be subjected to a discontinuity in a remote neighbor (i.e., two adjacent pixels are associated with two non-adjacent remote neighbors). However, since the weight of the values associated with these remote neighbors is small compared to that of the adjacent neighbors, in practice the effect of the values associated with these remote neighbors may be neglected.

Preferably, the method further comprises retrieval of the next boundary pixel along rows and columns. Since the boundary is changing dynamically, at each point, according to the method provided, it is required to find the pixel's remote neighbors, that change from one iteration to the next iteration. This fact might pose a rather complicated problem.

Following are several embodiments that offer simple implementation options that are included within the scope of the present inventions.

According to one embodiment of the present invention, two data structures, R and C are maintained. The term a "data structure" as used herein throughout the present application is used to denote a data organization, management, and storage format that is usually chosen for an efficient access to data. More precisely, a data structure is a collection of data values, the relationships among them, and the functions or operations that can be applied to the data. R[i] is a list (or of a vector) of the active boundary pixels along the i'th row in a sorted order. C[j] is a list (or of a vector) of the active boundary pixels along the j'th column in a sorted order. An active boundary pixel is a boundary pixel located adjacent to a pixel having a missing disparity value, along the corresponding row or column (a boundary pixel whose two adjacent neighbors along the corresponding row or column are also boundary pixels is not an active boundary pixel anymore) along its row or column. A pixel may be an active boundary pixel along its row, an inactive boundary pixel along its column, and vice versa. Each of the lists, stores active boundary pixels in its respective direction (i.e., in the horizontal or vertical direction). The data structures R and C can be initialized in a linear time by carrying out two passes over the image, one at each direction.

At each round of the main loop of the method provided, a search for coordinates (i,j) is carried out in the lists R[i] and C[j], in order to find the next and previous active boundary pixels of (i,j). After completing the processing of pixel (i,j), the lists R[i] and C[j] are updated by insertion of (i,j). The pixel may cause its adjacent neighbor to become an inactive boundary pixel, in which case (i,j) will replace the neighbor, while the list size remains the same. In some cases, (i,j) needs to be inserted in the middle of a list, in which case the list is expanded.

The advantage of this embodiment is its simplicity. For many holes, the size of the lists will be small throughout execution (for example, convex shapes have only 2 values per list). In cases where the lists are large lists (e.g., when the missing disparity values of a large number of holes are being filled simultaneously), a finger search can be used to quickly locate pixel (i,j) in the lists. The term "finger search" as used herein throughout the application is used to denote a search conducted on a data structure, that is an extension of any search operation that the data structure supports, where a reference (finger) to an element in the data structure is given along with the query. While the search time for an element is most frequently expressed as a function of the number of elements in a data structure, finger search times are a function of the distance between the element and the finger. Implementing this embodiment requires storing for each list, the additional information of the last position accessed in that list. When processing a new pixel, it is possible to use that position as the finger, as well as starting the search using the indices of the previous search along the respective rows and columns.

Figure 4:
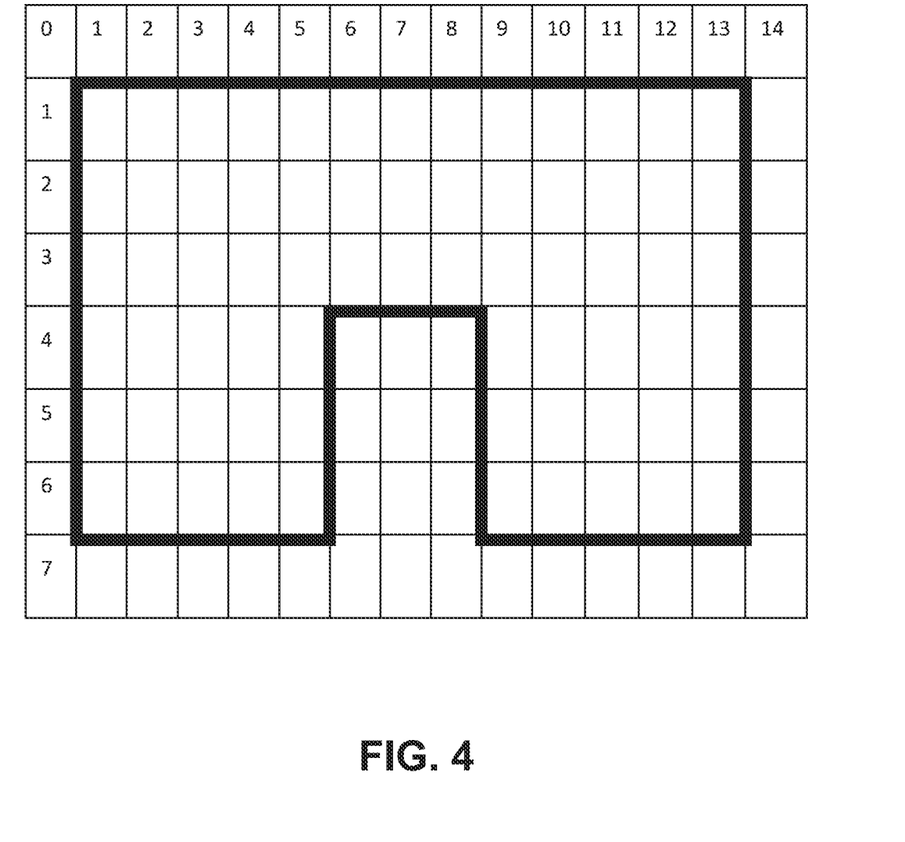
FIG. 4—demonstrates the lists data structure for active boundary pixels along rows (R) and columns (C), at the initialization phase.

FIG. 4 demonstrates the lists data structure for active boundary pixels along rows (R) and columns (C), at the initialization phase.

As exemplified in FIG. 4, the values of the data structure for active boundary pixels located along rows (R) and columns (C) at the initialization stage of this example, are R[0]=[ ]
R[1]=[0,14]
R[2]=[0,14]
R[3]=[0,14]
R[4]=[0,6,8,14]
R[5]=[0,6,8,14]
R[6]=[0,6,8,14]
R[7]=[ ]
Whereas
C[0]=[ ]
C[1]=[0,7]
C[2]=[0,7]
C[3]=[0,7]
C[4]=[0,7]
C[5]=[0,7]
C[6]=[0,4]
C[7]=[0,4]
C[8]=[0,4]
C[9]=[0,7]
C[10]=[0,7]
C[11]=[0,7]
C[12]=[0,7]
C[13]=[0,7]
C[14]=[ ].

By another embodiment, the search that is carried out, is a binary search tree. The term "binary search tree" as used herein refers to a rooted binary tree data structure with the key of each internal node being greater than all the keys in the respective node's left subtree and less than the ones in its right subtree. This embodiment is characterized by having a O(n*log(k)) running time, where k is the size of the maximal tree encountered and n is the total number of hole pixels being filled.

According to another embodiment, the search is conducted for all pixels located within a constant distance of k pixels in the horizontal or vertical directions. If no pixel's disparity value is found, only the disparity value of the pixel being the adjacent neighbor is used. The idea of this embodiment is that if a remote boundary pixel is located very far, its influence would be negligible. Yet, if such a remote boundary pixel is found within a distance of k pixels, one still has k pixels that can be used for the disparity values' interpolation until the image function meets the opposite boundary. For small value of k, this embodiment maintains a linear running time.

According to another embodiment of the present invention, the data structure lists are combined with a constant lookahead functionality. The lists are initialized and used as described before, with the exception that whenever a list size becomes larger than a pre-defined constant, the constant lookahead mechanism is applied instead of expanding that list. In practice, a small list size is applicable for many shapes, such as for example, convex shapes having two elements per the list referred to above, while the pre-defined fixed-lookahead mechanism may provide reasonable results for difficult cases. This embodiment, i.e., using a pre-defined constant lookahead functionality, guarantees a linear running time for all cases. Yet, for some common hole shapes that occur in real practice, the lists implementation also run in a linear time when the sizes of these lists (the number of active boundary pixels in each row or column) is bounded by a small number. The case where large lists are required, is not a typical case for a single hole. However, large lists are required when a plurality of holes need to be filled simultaneously (during a single pass over a region of the the image that comprises many holes). Large lists may also be required when data is sparse, i.e., there are few data points in a mostly void image.

There is a number of possible ways of implementing the solution proposed by the present invention. These options are:
a. Carrying out the proposed method for each hole (i.e., a pixel with a missing disparity value), separately.
b. Carrying out the proposed method for the entire image simultaneously.
c. Carrying out the proposed method on image blocks (windows), and filling the missing disparity values of pixels contained in each respective block, one block at a time.
d. Filling the holes while processing a pre-defined number of image rows as they arrive in a real-time implementation. However, this version has a limited range of lookahead in the vertical direction.

In the solutions known in the art (for example in P4), image gradients are utilized to propagate information in a way that preserves the image edges and isophotes. In contradistinction to this prior art approach, the present solution relies on smoothing the interior of holes. Obviously, the solution provided by the present invention may further include using image gradients in a way similar way to the one described in P4. Edges can also be preserved by dividing the region that includes pixels with missing values that need to be filled, to subregions, and filling each of these subregions without considering information associated with the other regions as a boundary condition.

For the simplicity of the description, the present solution was described for 4-connected neighborhood surrounding each pixel. As will be understood by persons skilled in the art, this method can be further extended to 8-connected (or higher) neighborhood surrounding each pixel.

Moreover, the method provided by the present invention also encompasses an embodiment wherein the lookahead functionality option for remote boundary pixels at diagonal directions, in which the appropriate data structures are used, or searches along the diagonals extending from each relevant pixel, may be carried out.

Figure 5A:
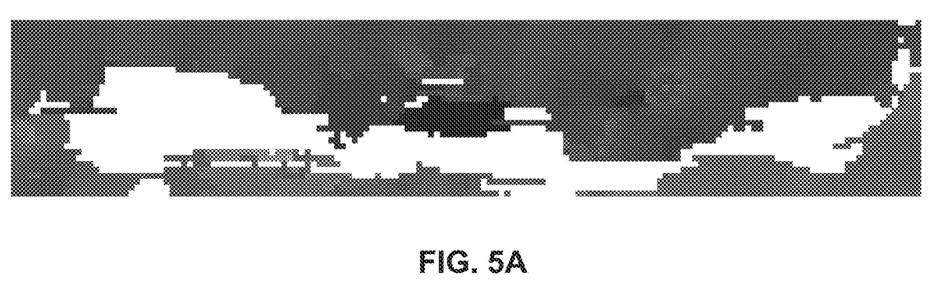
FIGS. 5A to 5D—illustrates a number of embodiments of carrying out the present invention.
Figure 5B:
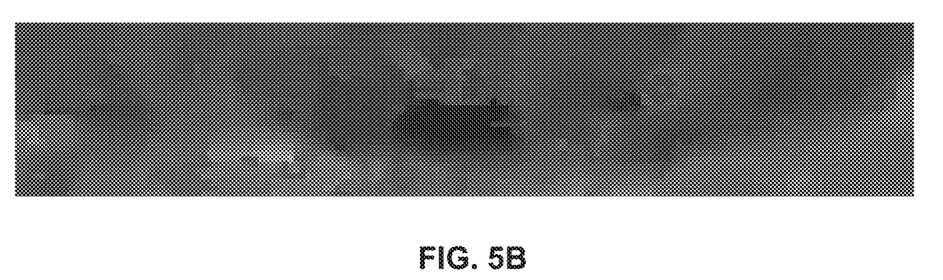
Figure 5C:
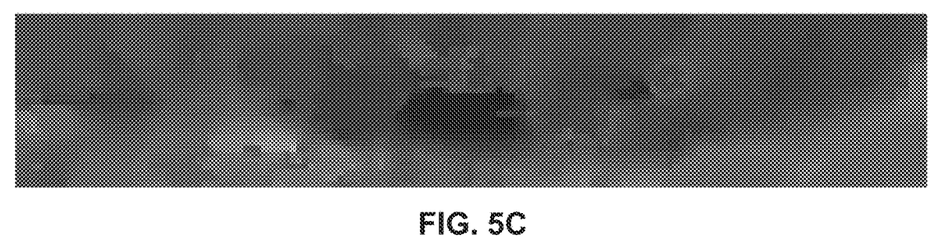
Figure 5D:
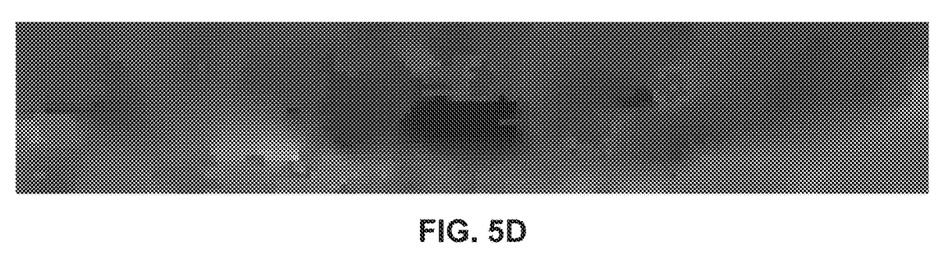

FIGS. 5A to 5D demonstrate certain embodiments discussed above of carrying embodiments of the present invention. FIG. 5A presents an input image provided with holes (pixels with missing disparity values (i.e., the white regions need to be filled). FIGS. 5B to 5D illustrates different methods of filling these holes. FIG. 5B illustrates a method of filling the holes (the white regions of FIG. 5A) by using dynamic lists.

FIG. 5C illustrates a method of filling the holes (the white regions of FIG. 5A) using a fixed pre-defined horizontal and vertical lookahead approach, whereas FIG. 5D illustrates a method of filling the holes (the white regions of FIG. 5A) using a fixed-length pre-defined horizontal, vertical and diagonal lookahead.

According to another embodiment of the present invention, the method provided further comprising a step of processing in parallel data associated with a plurality of pixels, wherein each pixel of that plurality of pixels is located at a distance of one pixel from the current boundary.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different objects, not all of which are required in all embodiments of the invention. Some embodiments of the present invention utilize only some of the objects or possible combinations of the objects. Variations of embodiments of the present invention that are described and embodiments of the present invention comprising different combinations of features noted in the described embodiments will occur to persons of the art. The scope of the invention is limited only by the following claims.

The invention claimed is:

1. A method for use in processing data retrieved from at least two image capturing sensors used to generate a 2D stereo image, wherein the method is configured to fill missing disparity values of pixels included in that image, wherein the method comprises the steps of:

a) receiving an image or part thereof that comprises a plurality of pixels each associated with a respective disparity value and at least one pixel having no disparity value associated therewith;

b) identifying all pixels having known respective disparity values being boundary pixels, that are located adjacent to pixels having no disparity value associated therewith;

c) inserting the pixels having no disparity value associated therewith, that are adjacent to at least one boundary pixel, into a queue;

d) applying a loop of popping pixels from the queue until the queue is empty, by which pixel (i,j) is popped from the queue, and confirming whether that pixel (i,j) has a disparity value associated therewith or not;

e) determining if pixel (i−1,j) is a boundary pixel, and if in the affirmative, identifying a next boundary pixel (i+d,j) along a column to which pixel (i,j) belongs, and setting the value vi to:

$vi=(I[i-1,j]*d+I[i+d,j])/(d+1)$ whereas if a next boundary pixel does not exist, setting vi to vi=I[i−1,j]), and if pixel (i−1,j) is not a boundary pixel, and if (i+1,j) is a boundary pixel;

identifying a next boundary pixel (i-d,j) along a column to which pixel (i,j) belongs, and setting the value vi to:

$vi=(I[i+1,j]*d+I[i-d,j])/(d+1)$ and if a next boundary pixel does not exist, setting vi to vi I[i+1,j];

f) determining if pixel (i,j−1) is a boundary pixel, and if in the affirmative, identifying a next boundary pixel (i,j+d) along a row to which pixel (i,j) belongs, and setting the value vj to:

$vj=(I[i,j-1]*d+I[i,j+d])/(d+1)$ whereas if a next boundary pixel does not exist, setting vj to vj I[i+1,j]), and if (i,j+1) is a boundary pixel:

identifying a next boundary pixel (i,j-d) along said row to which pixel (i,j) belongs, and setting the value vj to:

$vj=(I[i,j+1]*d+I[i,j-d])/(d+1)$ while if a next boundary pixel does not exist, then vj I[i,j+1];

g) if both vi and vj exist, setting the value of pixel (i,j) to be equal to (vi+vj)/2, if only vi exists, setting the value of pixel (i,j) to be equal to vi, and if only vj exists, setting the value of pixel (i,j) to be equal to vj;

h) inserting coordinates' values of pixel (i,j)'s neighbors, namely, pixels (i−1,j), (i+1,j), (i,j−1) and (i,j+1) into the queue, provided that these coordinates are each associated with a pixel having no disparity value, and if so, marking (i,j) as a boundary pixel.

2. The method of claim 1, wherein the disparity values are determined by carrying out a weighted linear interpolation between an adjacent neighbor of the at least one pixel for which no information is provided, and a remote neighbor of the at least one pixel for which no information is provided, wherein most of the weight for carrying out said weighted linear interpolation is placed onto the adjacent pixel, while enough weight is assigned to the remote neighbor, thereby enabling disparity values of pixels that are processed towards another side of a pixel having a missing image value, its value will be interpolated linearly between two boundaries.

3. The method of claim 1, further comprises smoothing disparity values between boundary fronts that approach each other dynamically while processing said retrieved data.

4. The method of claim 1, wherein processing of the disparity values of pixels which are not associated with a disparity value is carried out dynamically, and is determined according to a shape of the original boundary of the original image, while the boundary between pixels having each a respective disparity value and pixels that are not associated with a respective disparity value, evolves dynamically.

5. The method of claim 1, wherein said method is carried out by implementing dynamic lists.

6. The method of claim 1, wherein said method is carried out by implementing a fixed pre-defined horizontal and vertical lookahead processing.

7. The method of claim 1, wherein said method is carried out by implementing a fixed pre-defined horizontal, vertical and diagonal lookahead processing.

8. The method of claim 1, further comprising a step of processing in parallel data associated with a plurality of pixels, wherein each pixel of that plurality of pixels is located at a distance of one pixel from the current boundary.

* * * * *